United States Patent [19]
Heath et al.

[11] Patent Number: 5,506,972
[45] Date of Patent: * Apr. 9, 1996

[54] COMPUTER SYSTEM HAVING DYNAMICALLY PROGRAMMABLE LINEAR/FAIRNESS PRIORITY ARBITRATION SCHEME

[75] Inventors: Chester A. Heath, Boca Raton, Fla.; James O. Nicholson, Austin, Tex.; James D. Reid, Boynton Beach, Fla.; Frederick E. Strietelmeier, Austin, Tex.

[73] Assignee: International Business Machines Corporation, Armonk, N.Y.

[*] Notice: The portion of the term of this patent subsequent to Feb. 7, 2012, has been disclaimed.

[21] Appl. No.: 315,167

[22] Filed: Sep. 29, 1994

Related U.S. Application Data

[63] Continuation of Ser. No. 65,057, May 20, 1993, Pat. No. 5,388,228, which is a continuation of Ser. No. 725,223, Jun. 26, 1991, abandoned, which is a continuation of Ser. No. 102,690, Sep. 30, 1987, abandoned.

[51] Int. Cl.$^6$ .................................................. G06F 13/36
[52] U.S. Cl. .................. 395/293; 395/728; 364/241.9; 364/242.6; 364/242.7; 364/242.8
[58] Field of Search .................................... 395/325, 725, 395/800

[56] References Cited

U.S. PATENT DOCUMENTS

| | | | |
|---|---|---|---|
| 4,257,095 | 3/1981 | Nadir | 395/325 |
| 4,703,420 | 10/1987 | Irwin | 395/325 |
| 4,787,033 | 11/1988 | Bomba et al. | 395/325 |

Primary Examiner—Kevin J. Teska
Assistant Examiner—Ayni Mohamed
Attorney, Agent, or Firm—R. S. Babayi

[57] ABSTRACT

A computer system having a plurality of devices which transmit and receive information over a channel is presented. The system includes, in the preferred embodiment, a central arbitration control circuit and a local arbiter associated with each device contending for channel access. Each local arbiter, corresponding to a device which desires channel access, generates a channel request signal to the central control circuit. At the appropriate time when the channel becomes available, the central control circuit generates an arbitrate signal. All local arbiters, then contending for channel access, compare the priority level on the arbitration bus with the priority value of the device it is arbitrating on behalf of, with the winning device gaining access to the channel. Each of the local arbiters contains a programmable circuit which enables the arbiter to operate either utilizing a linear priority arbitration technique or a fairness priority arbitration technique. Thus, each device is dynamically programmable to operate in a linear mode or a fairness mode depending on user and/or application needs. Additionally, each local arbiter includes a circuit which detects whether the device is a burst transfer device or a single transfer device.

14 Claims, 9 Drawing Sheets

FIG. 7

COMPUTER SYSTEM HAVING DYNAMICALLY PROGRAMMABLE LINEAR/FAIRNESS PRIORITY ARBITRATION SCHEME

This is a continuation of application Ser. No. 08/065,057, filed May 20, 1993, now U.S. Pat. No. 5,388,228; which application is a continuation of prior application Ser. No. 07/725,223, filed Jun. 26, 1991 (abandoned); which prior application is a continuation of prior original application Ser. No. 07/102,690, filed Sep. 30, 1987, now abandoned.

BACKGROUND OF THE INVENTION

The present invention relates to arbitration schemes for use in computer systems. More particularly, the invention provides for an arbitration scheme having a local arbiter for each device in the system which requires use of the channel, the local arbiter being programmable to provide either a linear priority arbitration technique or a fairness priority arbitration technique.

Presently, there are various arbitration schemes in existence which determine the order in which multiple devices in a computer system may gain access to the channel. The majority of schemes generally fall into one of two categories, namely a centralized arbitration scheme or a distributed arbitration scheme. In both schemes each device has a priority value associated with it which is compared to the priority values of other devices contending for use of the channel, with the device having the highest value winning access to the channel. However, in the centralized scheme the winning device is determined at a central device, such as a CPU, while in a distributed scheme each device makes its own determination if it is the winning device (i.e. highest priority device requesting access to the channel).

The most common arbitration schemes, whether centralized or distributed, utilize a linear priority arbitration technique in which the highest priority device generally maintains control of the bus as long as it may require, and thus may prevent lower priority level devices from gaining access to the bus for inordinate periods of time. This might ultimately result in overrun conditions in the lower priority devices.

Another solution is commonly referred to as a fairness priority arbitration technique in which each device is given an opportunity to gain access to the bus, after the highest priority device has relinquished control of the bus and before the highest priority device may regain control of the bus. One such technique prevents the device presently in control of the bus from contending for the next bus cycle, and generally works well for single transfer devices. However, this will allow first and second devices to trade off but together both devices may lock out a third device. Another type of fairness priority arbitration technique is shown in the Intel Manual for the 8289 device and is illustrated on page 2–196 of that document, the same technique again being illustrated in the Intel Manual for the 82289 device on page 3–167. In both instances, a centralized arbitration scheme is implemented in which a rotating priority resolving technique is utilized. A special circuit rotates priority between requesting devices, thus allowing each device an equal chance to use the multi-master system bus over a given period of time. Therefore, all the devices contending for the bus are required to participate in the rotating priority technique.

It is readily apparent from the aforesaid discussion that both the centralized arbitration scheme and the distributed arbitration scheme were originally designed so that all the devices working in the scheme operate either utilizing the linear priority arbitration technique or the fairness priority arbitration technique. However, with the addition of burst transfer devices intermingled with single transfer devices it became desirable to have a hybrid priority arbitration technique in which some devices may operate under the linear priority arbitration technique and other devices operate under the fairness priority arbitration technique.

One such hybrid technique, described in the article entitled "Arbitration and Control Acquisition in the Proposed IEEE 896 Futurebus" by D. M. Taub, found in the August 1984 issue of IEEE Micro, describes an arbitration scheme in which potential masters (PM's) are divided into two classes. The first class contains priority modules, whose need for the bus may be particularly urgent, for instance because of having to cope with realtime operations. The second class contains fairness modules, whose need for the bus is less urgent. Priority modules issue a request for the bus whenever they need it, and compete in the arbitration process the next time it occurs. On the other hand, once a fairness module has had control of the bus, it desists from issuing further bus requests until there are no requests left to service. However, each PM is preselected to be either a fairness module or a priority module and thus is not dynamically programmable to accommodate the varying needs of the user and/or different computer applications.

The present invention in the preferred embodiment contemplates an improved hybrid system by providing a dynamically programmable circuit in each local arbiter which allows either the linear priority arbitration technique or the fairness priority arbitration technique to be initiated depending upon the particular needs of the user and/or the application software being utilized.

Accordingly, it is an object of the present invention to provide a computer system having a dynamically programmable arbitration circuit for initiating either a linear priority arbitration technique or a fairness priority arbitration technique for each device requiring access to the system bus.

It is another object of the present invention to provide a computer system having a distributed priority arbitration scheme in which each device requiring access to the system bus employs a local arbiter associated therewith, the local arbiter having a circuit which is programmable to allow the local arbiter to initiate either a linear priority arbitration technique or a fairness priority arbitration technique.

It is yet another object of the present invention to provide a computer system having a distributed dynamically programmable linear/fairness priority arbitration scheme which accommodates a mixture of single transfer devices and burst transfer devices.

SUMMARY OF THE INVENTION

In accordance with the above and other objects of the present invention there is provided in the preferred embodiment a computer system having a distributed dynamically programmable linear/fairness priority arbitration scheme. The system comprises a local arbiter associated with each device which requires access to the system bus and a central arbitration control circuit. The local arbiters are interconnected via an arbitration bus and each local arbiter is set to a priority value representative of the priority level of its corresponding device. The central arbitration control circuit monitors the availability of the system bus and generates a +ARB/–GNT signal to each local arbiter which starts the arbitration cycle and allows the winning device to be granted access to the bus at the appropriate time. Each of the local arbiters includes a priority value compare circuit which compares the highest priority value on the arbitration bus to its own value to determine which device requesting access to the bus has the highest priority. The local arbiter further includes a circuit portion which is used to detect whether the associated device is a burst transfer device or not and a programmable circuit so that the associated arbitration circuit may operate either using a fairness arbitration priority technique (fairness mode) or a linear priority arbitration technique (linear mode). Thus, if a burst transfer device has control of the bus and is programmed to operate in the fairness mode, as soon as another device desires access to the bus the burst device will relinquish control of the bus after an appropriate number of transfers, allowing the next highest priority level requesting device to gain control of the bus. Since each local arbiter includes the programmable arbitration mode select circuitry, each device may operate either in a fairness mode or a linear mode, regardless of whether the device is a burst transfer device or single transfer device, depending upon the needs of the user and/or the specific requirements of a particular application software program.

DETAILED DESCRIPTION OF THE PREFERRED EMBODIMENT OF THE INVENTION

Figure 1:
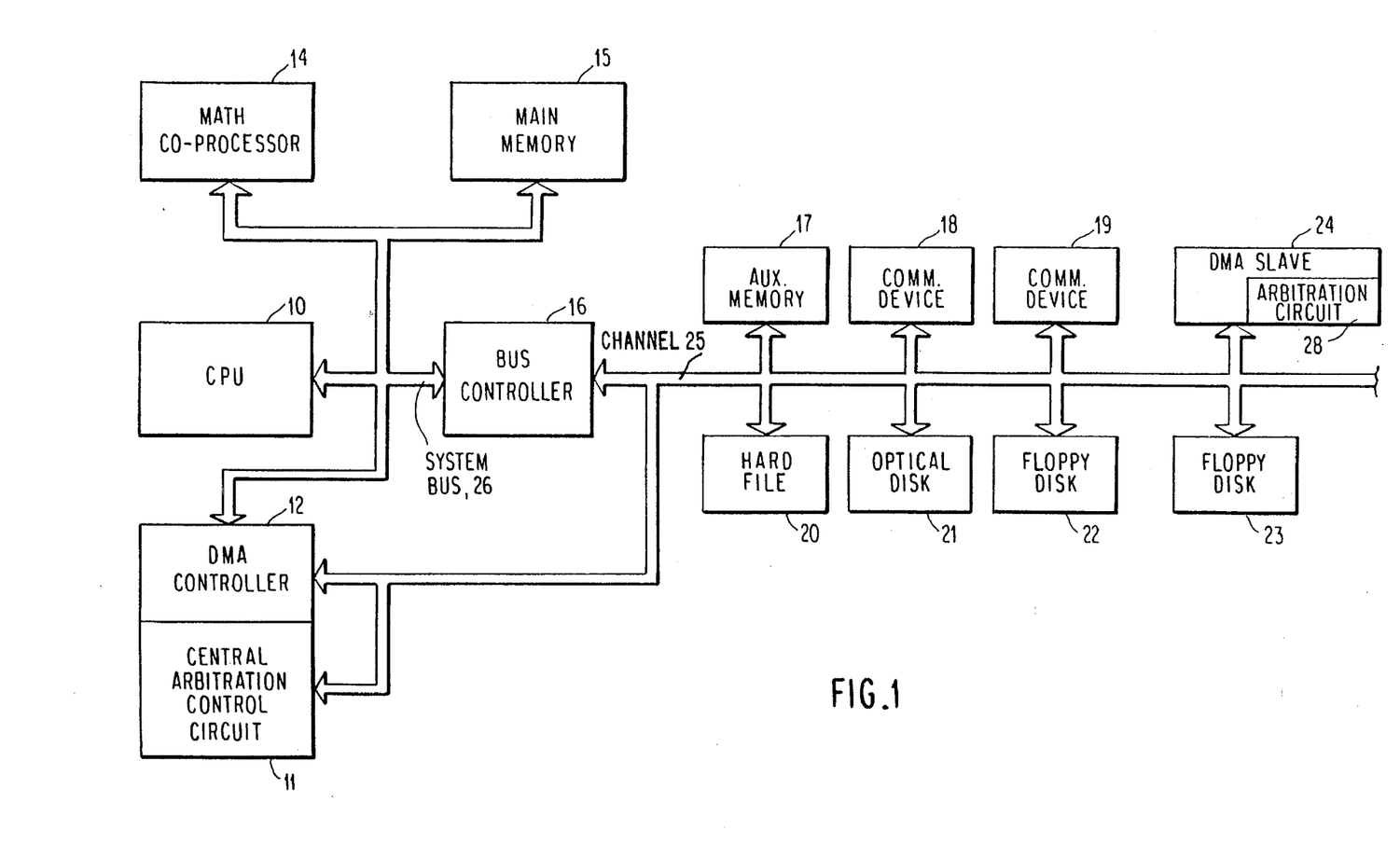
FIG. 1 is a block diagram showing a computer system employing the present invention.

Referring first to FIG. 1 of the accompanying drawings, there is shown a block diagram of a computer system in which the present invention is used to advantage.

A CPU 10 communicates with a main memory 15, bus controller 16 and math co-processor 14 via a system bus 26. Communication between the CPU 10 and its associated peripheral devices is through a bus controller 16, the latter being coupled to the peripheral devices through the channel 25. In the present example, the peripheral devices include an auxiliary memory 17, two communications devices 18 and 19, a hard file 20, an optical disk 21, and two floppy disks 22 and 23. Other peripherals can of course be used as well as system needs dictate. The peripheral devices are represented generically by DMA slave 24, but may also include devices which are actually bus masters.

A DMA controller 12 is provided to allow at least selected ones of the peripheral devices direct memory access. For this purpose the channel 25, or at least a portion thereof, is branched to the DMA controller 12. Each peripheral allowed DMA access is provided with an arbitration circuit 28, and each peripheral having an arbitration circuit 28 is assigned an arbitration (priority) level. As will be explained in more detail later, a central arbitration control circuit 11 generates appropriate control signals to allow the distributed arbitration circuits 28 to arbitrate on behalf of their respective devices for control of the channel 25.

Figure 2:
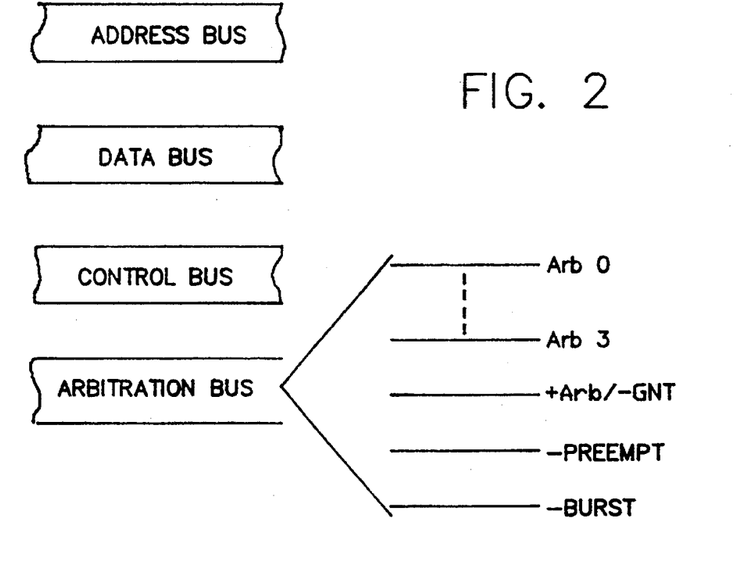
FIG. 2 is a conceptual diagram used to explain the operation of the present invention.

Referring now to FIG. 2, the channel 25 is further shown as being broken down into an address bus, a data bus, a control bus and an arbitration bus. The arbitration bus is comprised of four priority lines, namely ARB0 through ARB3, a +ARB/–GNT line, a —PREEMPT line, and a —BURST line.

Figure 3:
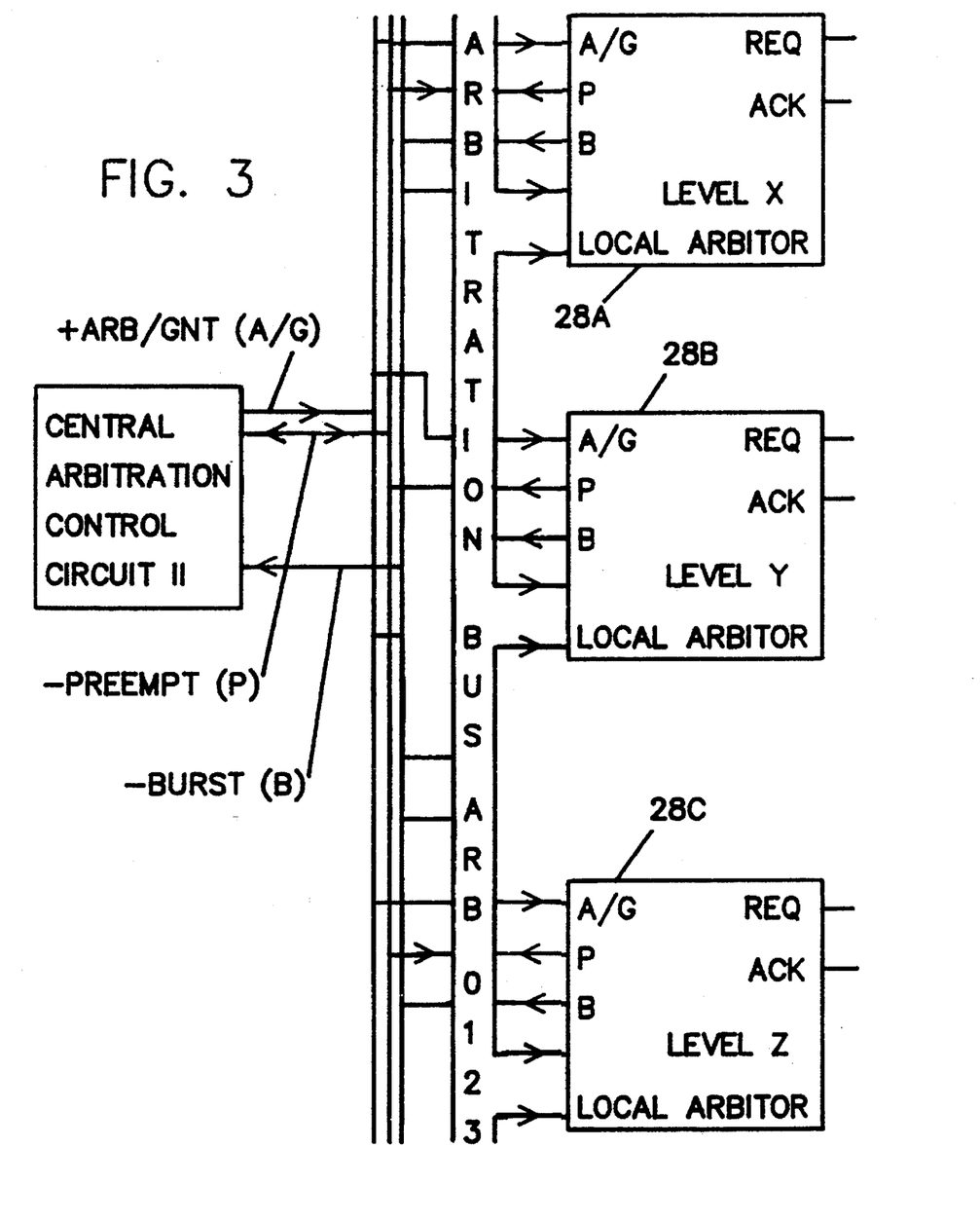
FIG. 3 is a block diagram illustrating the relationship between the central arbitration control circuit and the local arbiters of the present invention.
Figure 4A:
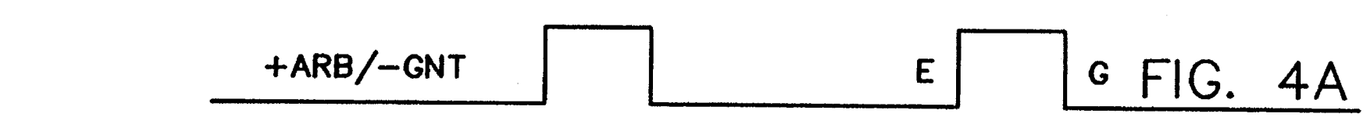
FIGS. 4A through 4F is a timing chart used to explain the operation of the block diagram of FIG. 3.
Figures 4B, 4C:
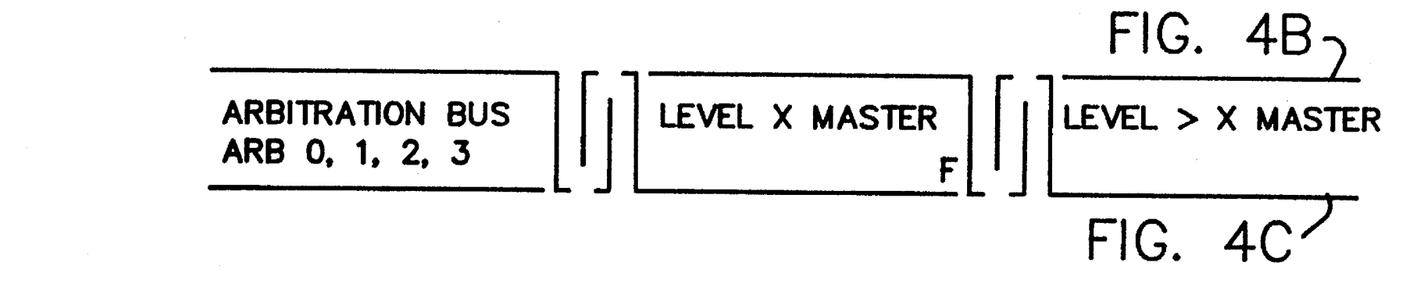
Figure 4D:
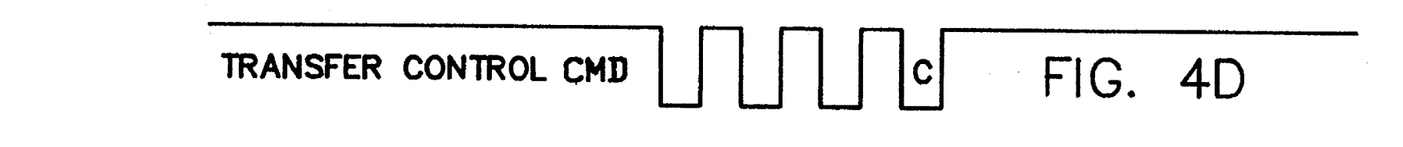
Figure 4E:
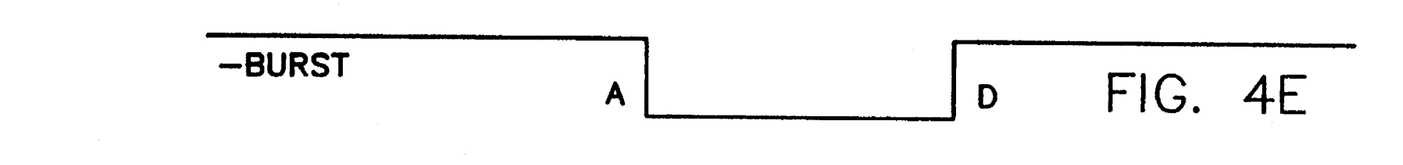
Figure 4F:
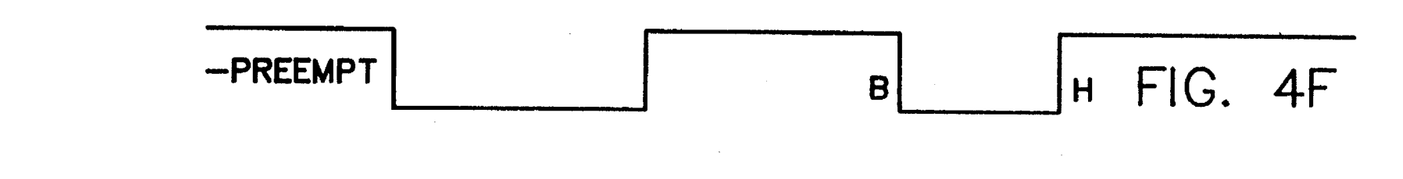

Referring now to FIG. 3, the relationship between the central arbitration control circuit 11 and the various local arbiter units 28A through 28C will be described. In general, when a device wants access to the channel 25 to transfer data, the local arbiter circuits 28A through 28C will receive a request signal from the particular device to which the arbitration circuit is related. The request signal is converted to a —PREEMPT signal which is generated by the local arbiter and transmitted to the central arbitration control circuit and each of the local arbiters over the —PREEMPT line of the arbitration bus. It should be noted in the specific embodiment of this invention that the —PREEMPT lines are OR'ed together and thus it is irrelevant to the central arbitration control circuit 11 which particular device is requesting an arbitration signal. As described earlier, each local arbiter circuit 28 has the capability of generating a —BURST signal over the —BURST line if the device which that particular local arbiter 28 is associated with happens to be a Burst device, such as the hardfile 20 or floppy disk drive 22 and 23. The central arbitration control circuit 11 generates the +ARB/–GNT signal at an appropriate time as determined by the CPU 10 HOLD signal and +REFRESH memory signal from a refresh controller (not shown) well known to those skilled in the art, in response to a —PREEMPT signal from one or more of the local arbiter circuits 28A through 28C.

Thus, when any one of the devices desires to contend for use of the channel 25, it generates a request signal to its corresponding local arbiter 28, which then generates a —PREEMPT signal over the —PREEMPT line or the arbitration bus. Then at the appropriate time when the bus becomes available, as determined by the HOLD signal from the CPU 10 and the +REFRESH signal from the refresh controller, the central arbitration control circuit 11 generates the +ARB state of the +ARB/–GNT signal over the arbitration bus to each one of the local arbiters 28. In response to the +ARB state, each of the local arbiters 28 which desires access to the channel 25 drives its priority level onto respective lines ARB0–ARB3 of the arbitration bus. Then each of the local arbiters 28A, 28B and 28C, desiring access to the channel 25 compares its designated priority level with the priority level on the arbitration bus and takes itself out of contention for the bus 25 in the event its priority level is lower than that being driven onto the arbitration bus. Thus, at the end of the arbitration cycle only the local arbiter 28 having the highest priority level during that arbitration cycle remains in contention for the channel 25 and thus gains control of the channel 25 when the —GRANT state is received from the central arbitration control circuit 11 over the +ARB/–GRANT line. If the device corresponding to the particular arbiter circuit 28A, 28B or 28C happens to be a Burst device, the —BURST signal is activated on the —BURST line to the central arbitration control circuit 11 so that burst transfers may be made in the event that the channel 25 is available for burst transfers.

A better understanding of the operation of the system illustrated in FIG. 3 may be appreciated by referring to the example represented by the timing charts of FIGS. 4A–4F. For purposes of illustration, assume that a Burst mode device has gained control of the channel as illustrated by (a) of FIG. 4E, and that another device then requests preemption as shown by (b) of FIG. 4F. Once the second device activates —PREEMPT, the Burst device presently in control of the channel completes the current transfer as illustrated in (c) of FIG. 4D. Upon completion of the current transfer, the Burst device that is relinquishing control of the channel removes its —BURST signal from the —BURST line as shown in (d) of FIG. 4E. It will not participate in the next bus arbitration cycle. The central arbitration control circuit 11 then places the +ARB/–GNT signal in the GRANT state as illustrated in (e) of FIG. 4A. It also represents the beginning of another arbitration cycle and arbitration for the channel 25 begins at (f) of FIG. 4C. After the +ARB/–GNT signal goes low (–GNT), control of the channel is granted to the new device as illustrated in (g) of FIG. 4A. The new device which has gained control of the channel 25 then removes the —PREEMPT signal in response to the —GRANT signal as illustrated in (h) of FIG. 4F.

Figure 5A:
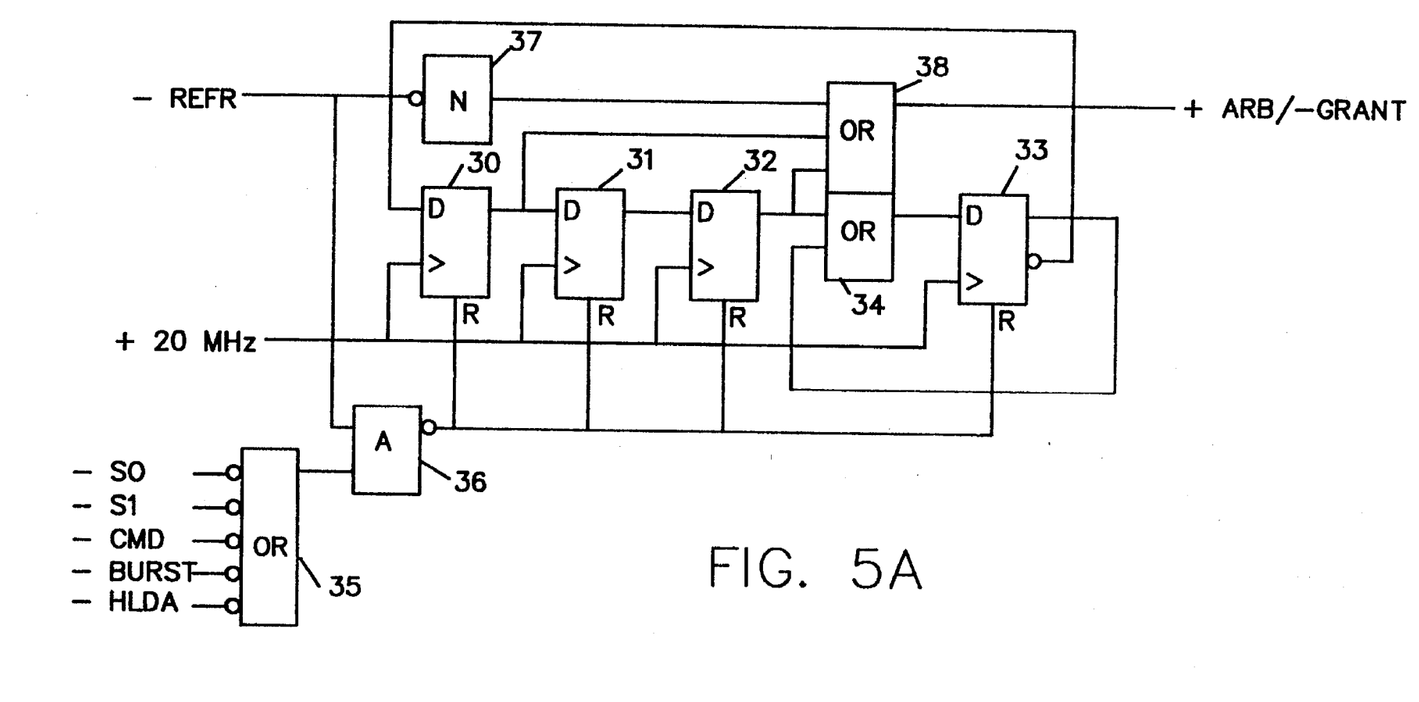
FIG. 5A is a circuit diagram illustrating a first embodiment of the central arbitration control circuit of FIG. 3.
Figure 5B:
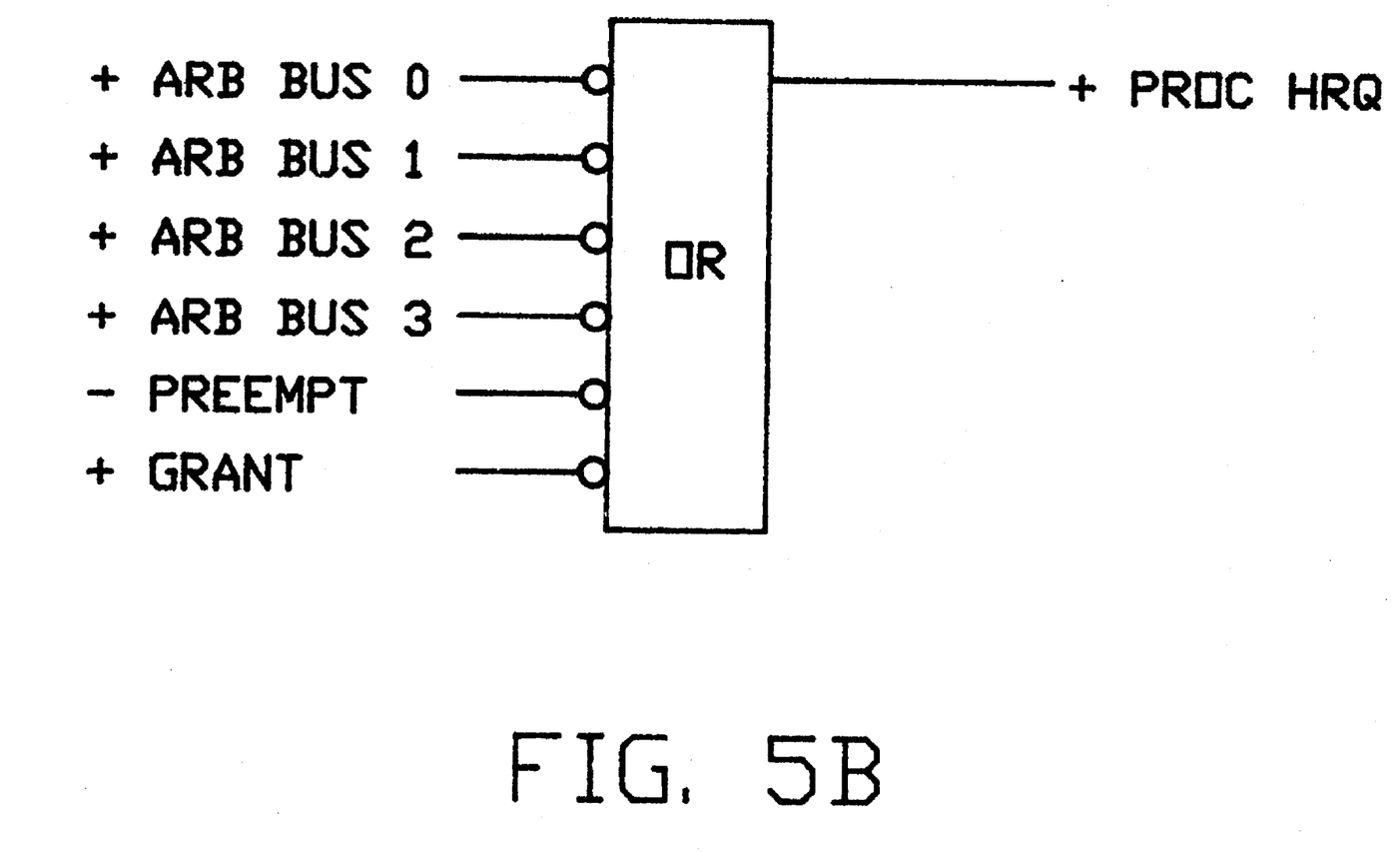
FIG. 5B is a circuit diagram illustrating a circuit from generating the processor HOLD REQUEST signal.
Figure 5C:
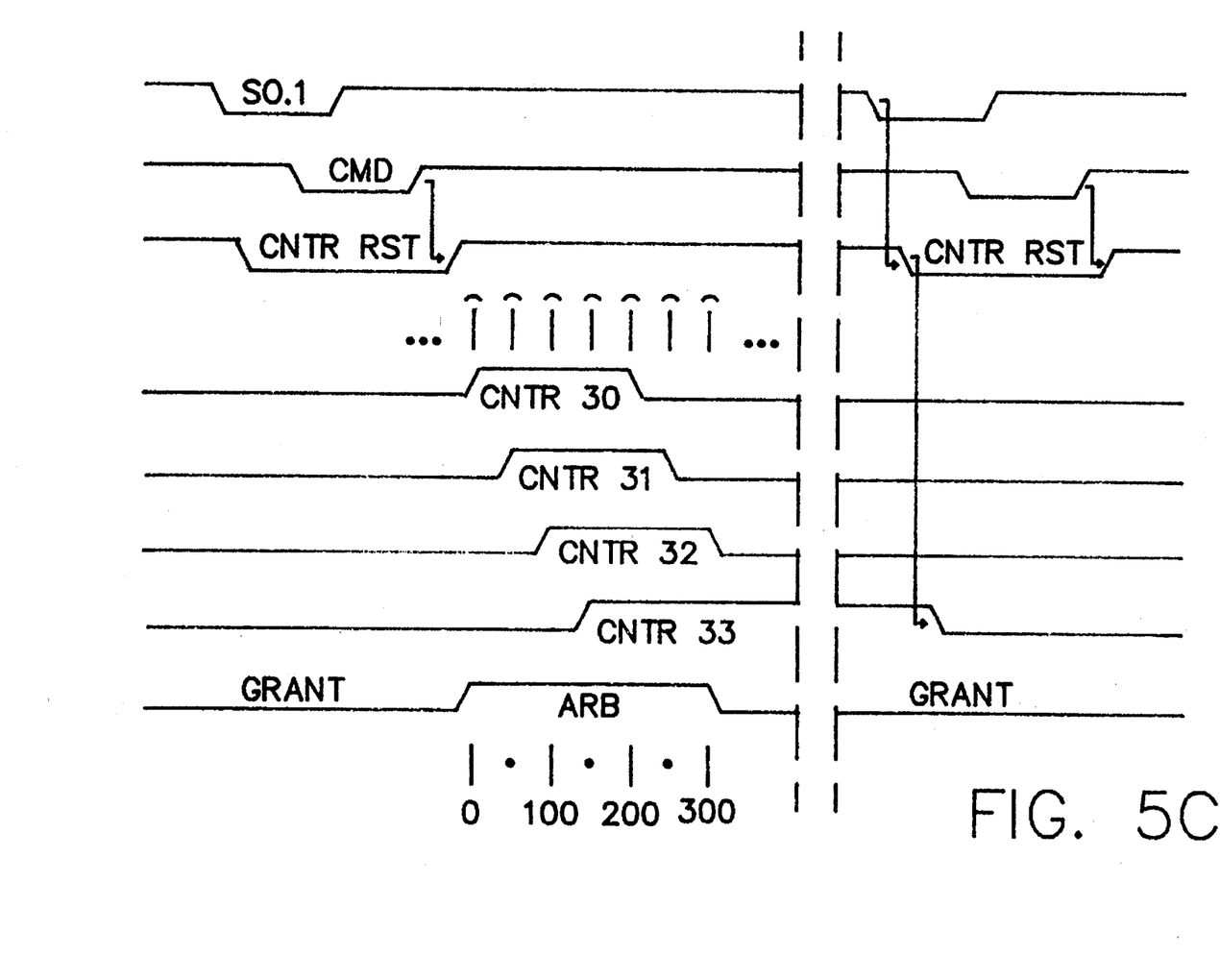
FIG. 5C is a timing chart used to explain the operation of the block diagram of FIG. 5A.

Referring now to FIG. 5A, a more detailed circuit description of the first embodiment of the central arbitration control circuit 11 is illustrated. The central arbitration control circuit 11 comprises a modified Johnson ring timing chain including counters 30 through 33 and OR gate 34, OR gate 35, NAND gate 36, inverter 37 and OR gate 38. Assuming the bus begins in an idle condition with the CPU 10 "owning" the bus, but not using it, the circuit operation will be described hereinafter in conjunction with the timing chart of FIG. 5C. In the aforesaid condition, +ARB/–GRANT is then active low, and the arbitration priority levels ARB 0 through ARB 3 all have a value of 1. The modified Johnson ring timing chain is held reset by the CPU 10 +HLDA signal through the OR gate 35 and the NAND gate 36. When a device needs access to the bus, the —PREEMPT signal is activated. As shown in FIG. 5B, the —PREEMPT signal going active results in the output of OR gate 39 going positive representing a PROCESSOR HOLD REQUEST (+PROC HRQ) signal. The +ARB 0 through +ARB 3 signal and a +GRANT signal are also input to the OR gate 39 to insure that the CPU 10 will not interfere with bus transfers by other devices. The +PROC HRQ signal causes the CPU 10 to deactivate +HLDA which results in the reset signal (output from OR gate 35) being removed from counters 30 through 33. It should be understood that inputs —S0, —S1, —CMD and —BURST must be inactive in order for +HLDA to remove the reset signals from the aforesaid counters 30 through 33, as illustrated in FIG. 5C. The —S0 signal represents the WRITE cycle, and the —S1 signal represents the READ cycle. The —CMD signal is generated by the current bus master a specified time period after —S0 or —S1 (in the preferred embodiment a minimum of 55 nanoseconds). During READ cycles the —CMD instructs the slave device to place READ data onto the bus and during WRITE cycles —CMD is activated for validation of WRITE data.

On the next (20 MHZ) clock pulse, after +HLDA is deactivated, the counter 30 output is set causing the output of OR gate 38 to go high (+ARB) indicating an arbitration timing period. The OR gate 38 output remains high until the output of counter 32 goes low sometime after the output of counter 33 has gone high. This establishes a 300 nanosecond timing pulse for the +ARB/–GNT signal. The output from counter 33 remains set until the device begins a bus cycle by either activating —S0 or —S1. The output is then reset, and the counters 30 through 33 are ready to begin timing again at the end of the current bus cycle. If —BURST is active, the timing chain is held reset until the end of the last cycle. If no devices are requesting bus service, the bus returns to the idle condition and control is returned to the processor. HLDA is reactivated and the bus is now available for processor operations.

Figure 8:
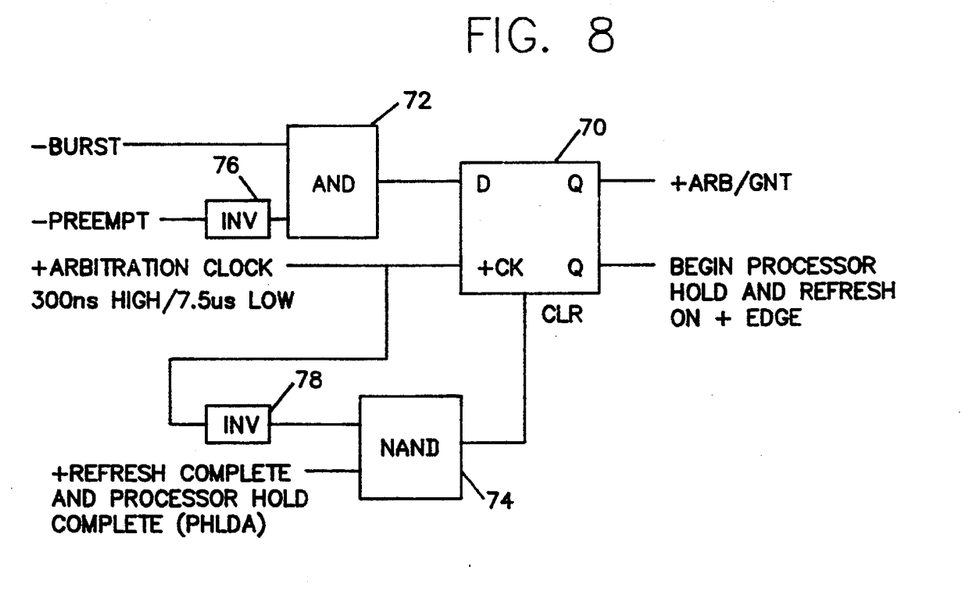
FIG. 8 is a circuit diagram illustrating an alternate embodiment of the central aribtration control circuit of FIG. 3.

Referring now to FIG. 8, a circuit description of an alternate embodiment of the central arbitration control circuit 11 is illustrated. The central arbitration control circuit 11 is comprised of a D flip-flop 70, the Q output of which represents the +ARB/–GNT signal, a $\overline{Q}$ output which represents a signal to begin processor HOLD and REFRESH memory on the positive edge, a D input connected to the output of AND gate 72, and a clock input connected to an arbitration clock having a 300 nanoseconds high/7.5 microsecond low timing waveform. The flip-flop 30 also has a clear input connected to an output of the NAND gate 74. The AND gate 72 has one input connected to the —BURST line of the arbitration bus and its other input connected to an inverter 76 which has its input connected to the —PREEMPT line of the arbitration bus. NAND gate 74 has one input connected to an inverter 78 which has its input connected to the arbitration clock, and a second input connected to the +REFRESH signal from the refresh controller and processor HOLD COMPLETE (pHLDA) signal generated by the CPU 10 of FIG. 1. The central arbitration circuit 11 operates as follows: When the —PREEMPT signal becomes active, the output of the inverter 76 becomes high. If the BURST signal is not active then the output of the NAND gate 72 will go high setting the data input of the arbitration latch 70 high. The next positive edge of the arbitration clock steps the high level on the input to the latch 70 thereby moving the Q output (+ARB/–GNT) signal high. If the bus has been owned by the processor 10 the HOLD request to the processor 10 is issued at the $\overline{Q}$ bar output of the latch 70. Additionally, if a refresh cycle to memory is due it can also be issued at this time. After 300 nanoseconds, the arbitration clock will go low and the inverter 78 will generate a high level input to the NAND gate 74. After REFRESH is complete and processor HOLD operations are completed (as indicated by pHLDA signal from the CPU 10 going active), the other input of the NAND gate 74 goes high and thus the output of the NAND gate 74 goes low. The low output from the NAND gate 34 resets the arbitration latch 70 and sets the +ARB/–GNT line to the GRANT state completing the operation. If the —PREEMPT line remains active, another arbitration cycle will be inserted on the next positive transition of the arbitration clock unless —BURST is asserted by the local arbiter that wins the competition for the GRANT. If —BURST is asserted by the granted arbiter then arbitration will be inhibited indefinitely. The present system therefore imposes a rule that —BURST may not be held longer than approximately 8 microseconds after —PREEMPT is activated. —PREEMPT becomes active periodically approximately an average 16 microseconds for REFRESH. The net result is that the arbitration is not suspended longer than 24 microseconds worst case.

Figure 6:
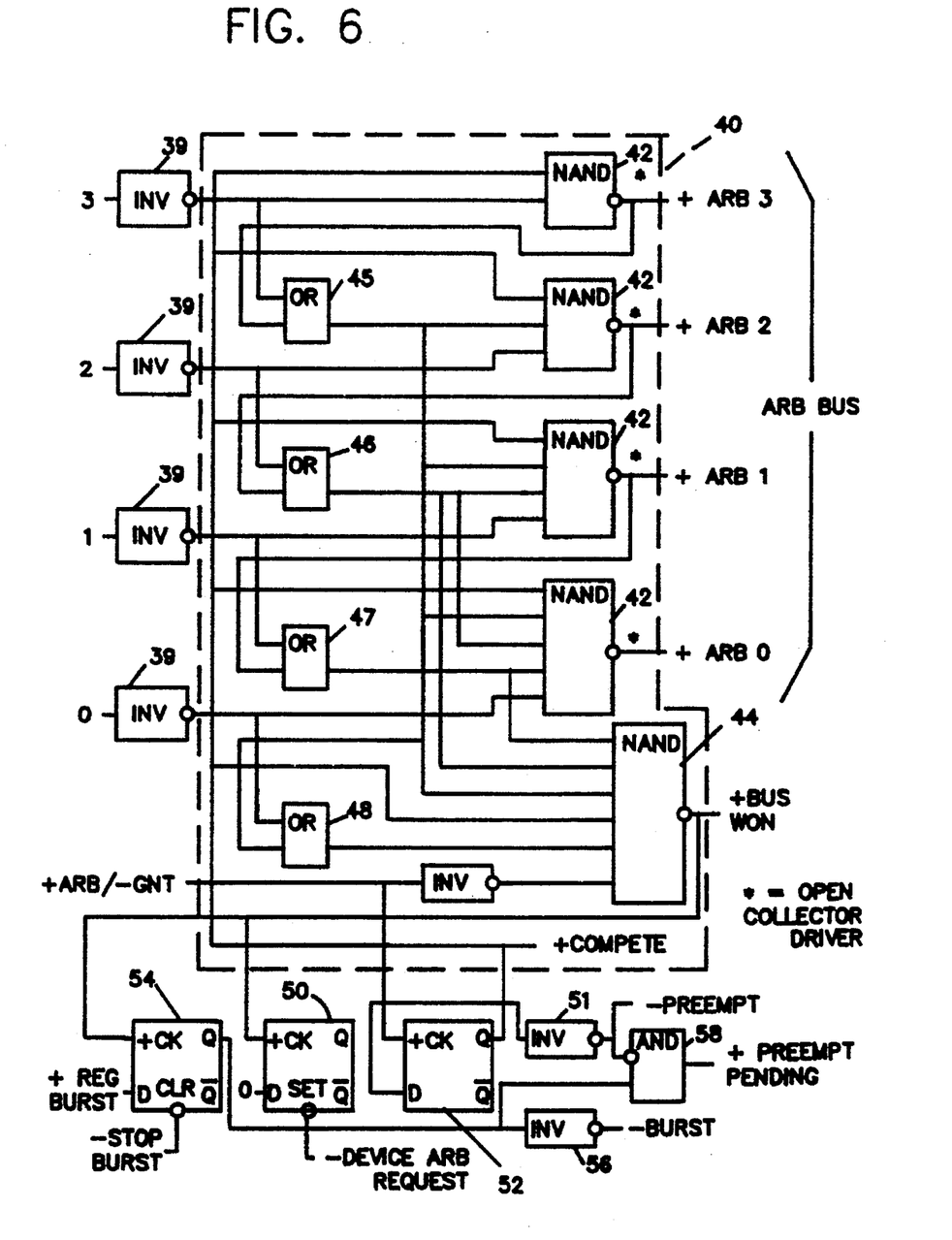
FIG. 6 is a schematic drawing of the local arbiter 28 of FIG. 3.

Referring now to FIG. 6, a logic diagram of one of the arbitration circuits 28 is illustrated. The arbitration level assigned to a particular arbitrating device is set in a register not shown, but which stores the values ARB3 through ARB0. This may be done using any of a number of well known techniques. Preferably, the CPU 10 addresses the particular device associated with the local arbiter 28 through a pre-assigned port so that the arbitration level can be set by software. This may be done through the BIOS (basic input-ouput system), POST (power on self-test) at reset, the operating system, or the applications programs desired. Otherwise, it is possible to input the channel priority assignment value with hardware switches.

It should be understood that the portion of the local arbitration circuit 40, as illustrated in FIG. 6 which actually compares the priority level of its associated device with the priority level being driven on the priority arbitration bus is identical to that which is disclosed and discussed in detail in American National Standards/IEEE Standard Number ANSI/IEE Standard 696–1983, published by the Institute of Electrical and Electronic Engineers, Inc., Jun. 13, 1983. In general, each device incorporated in the arbitration scheme is provided with such a circuit, and the circuits are interconnected to each other via an ARB BUS. The ARB BUS in the example shown has four data lines ARB0–ARB3, allowing for sixteen different arbitration levels. Any desired number though can be used. During an arbitration time period designated by the +ARB/–GNT signal, all devices desiring to gain control over the bus (those having the +COMPETE signal set to the appropriate state) transmit their arbitration (priority) levels onto the ARB BUS. This occurs when the +ARB/–GRANT signal goes high. The value then held in the priority register is gated to the NAND gates 42 onto the respective line of the ARB BUS. At the end of the arbitration period, the value on the ARB BUS lines ARB0 through ARB3 will be the value of the arbitration level of the device having the highest level. The output Of the AND gate 44 of the winning device will indicate a BUS WON indication to its corresponding device. It should be understood that the local arbiter 28 of the present invention begins the arbitration cycle in response to the +ARB/–GRANT signal, as opposed to the HOLD and pHLDA signals illustrated in the IEEE article.

It should be further understood that whenever the channel has not been granted to the CPU 10 that it, like other devices, will not be active on the channel. When the CPU 10 is not active on the channel it may be held inactive entirely or may be active on its local bus.

A better understanding of the operation of the local arbiter 28 may be appreciated by the following example. For purposes of the example, assume that the priority level in the priority register is 6, and therefore the ARB 3 bit would be equal to 0, the ARB 2 bit would be equal to 1, the ARB 1 bit would be equal to 1 and the ARB 0 bit would be equal to 0. This value is inverted to 1001 by the inverters 39. Now assume that the local arbiter is competing against another arbiter which has an assigned arbitration priority level of 7. The device associated with the local arbiter 28 having a priority level of 6 generates a 31 DEVICE ARB REQUEST for use of the bus, which sets the Preempt latch 50 and —PREEMPT active through the inverter 51, and waits for an arbitration cycle. The central arbitration control circuit 11 responds to the active —PREEMPT and the +ARB/–GNT line goes into the arbitration state as explained earlier. The COMPETE latch 52 is set by the Q output of the Preempt latch 50 on the positive edge of the +ARB/–GRANT signal driving the +COMPETE signal active. The other competing arbiter sets ARB3 equal to 0, ARB2 equal to 1, ARB1 equal to 1, ARB0 equal to 1. The first NAND gate 42 associated with the ARB3 line drives the ARB3 line low because COMPETE equals 1 and the inverted ARB3 bit equals 1. The OR gate 45 does not disable lower OR stages because one of its inputs is high, namely the inverted ARB2 bit. If neither of the inputs to this gate were 1, then all lower order NAND gate drivers would be disabled. The NAND gate 42 associated with the ARB2 bus line sets its output high because the inverted ARB2 bit is low. The OR gate 46 therefore does not disable the lower order stages because one of its outputs is high (the ARB2 bit is high on the arbitration bus). If this bit on the arbitration bus were driven low by an opposing arbiter then all lower order stages of this arbiter would be disabled and this arbiter would not win the competition for the channel. The NAND gate 42 associated with the ARB1 bus line sets its output high because the inverted ARB1 bit is low. The OR gate 47 therefore does not disable lower order stages because one of its inputs is high (the ARB1 bit is high on the arbitration bus). The NAND gate 42 associated with the ARB0 bus line drives the ARB0 line low because COMPETE equals 1 and the inverted ARB0 bit equals 1, and it is not disabled by any higher ordered compare. The OR gate 48 therefore does not disable lower ordered stages because one of its inputs is high (the inverted ARB0 bit is high). The opposing arbiter loses the competition at this point because its ARB0 bit is high and the ARB0 bus line signal is low. Both inputs to its OR gate 48 are low and the AND gate 44 is therefore disabled. After a prescribed settling time the +ARB/–GRANT goes low to the GRANT state. Because no stage in the arbiter has disabled an input to AND gate 44 because the +ARB/–GRANT signal is low, COMPETE is high, the AND gate 44 output is high indicating a BUS WON (see ACK of FIG. 3) signal. The Preempt latch 50 is clocked by the BUS WON signal, and the —PREEMPT signal becomes inactive. The operation of the arbitration circuits 28 as explained so far only applies to those devices which generally only transmit one word of data before relinquishing control of the bus. However, as mentioned earlier, some of the devices in the system such as the floppy disk 22 and 23 and the hardfile 20 are able to transmit bursts of data, and thus the local arbitration circuitry must take the burst transfers into account. Thus, if a burst transfer is requested by a device, then the Burst latch 54, is set by the BUS WON signal and the —BURST signal is asserted from the inverter 56. Normally, as long as the —BURST signal is asserted from the inverter 56, additional arbitration cycles are inhibited. The Burst latch 54 is deactivated when the device gets to its end of transfer or a —BURST signal condition is asserted on the clear input of the Burst latch 54.

Still referring to FIG. 6, it is readily apparent that if a bursting device is assigned a very high priority number it could maintain control of the channel 25 for inordinate amounts of time and possibly cause overrun conditions in other devices. Thus, it becomes necessary to implement a fairness circuit which forces the high priority bursting device off of the channel 25 at an appropriate time and to allow other lower priority devices access to the channel 25 in order to prevent the overrun conditions. In order to implement fairness the AND gate 58 is added to produce an output signal when the local arbiter 28 is driving the —BURST signal and the —PREEMPT signal is also active. For this example, —PREEMPT is not set for a future cycle while making a burst transfer on the channel. The existence of this condition indicates that a device is requesting arbitration but the arbitration signal is being withheld by the central arbitration control circuit 11 as long as —BURST is driven by the local arbiter 28.

Figure 7:
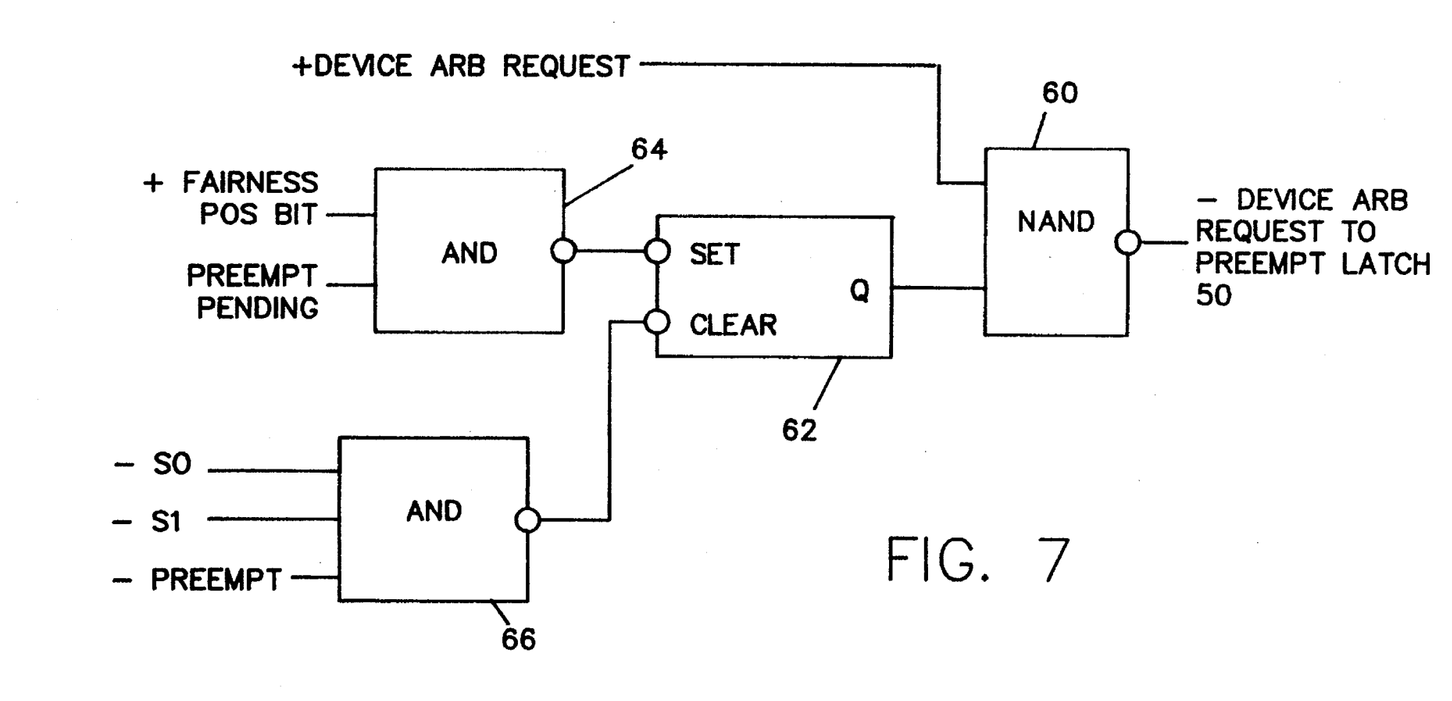
FIG. 7 is a schematic drawing of the programmable linear/fairness mode selection circuitry in the local arbiter 28 of FIG. 3.

In order to fully implement the fairness technique, the circuitry of FIG. 7 must be added. The fairness circuit includes a NAND gate 60 having one input connected to the +DEVICE ARB signal and a second input connected to the Q output of the latch 62. The latch 62 has its set input connected to the output of AND gate 64 and its clear input connected to the output of the AND gate 66. The AND 64 has one input connected to the line which receives a fairness ON or OFF bit which is normally generated by the power on self test (POST) software. Of course other applications software could be used to dynamically change the fairness bit according to the needs of the particular program. The other input to the NAND gate 64 is connected to the output of the NAND gate 58. AND gate 66 has three inputs, namely the status bits S0 and S1 and the —PREEMPT signal. The status bits are those commonly generated by the CPU 10 and are well known to those skilled in the art. They become inactive (high) during idle periods between bus cycles. The fairness circuit of FIG. 7 operates as follows:

When the AND gate 64 detects a positive fairness bit (typically during POST) and the other input to the AND gate 64 detects a "+PREEMPT PENDING" condition from the output of the AND gate 58, the latch 62 is set. Any device requests for arbitration are then interrupted by the NAND gate 60 and are not propogated to the Preempt latch 50 whenever the latch 62 is set. When the —PREEMPT signal becomes inactive (high) indicating that no other devices are requesting an arbitration cycle, and the status bits SO and S1 are inactive (high) the latch 62 is cleared. It should be understood that the active period in status is long enough that the —PREEMPT line has time to charge to a high level so that all local arbiters 28 monitoring the —PREEMPT signal will be allowed to compete during the next arbitration cycle. After the latch 62 has been cleared the request for arbitration from each device is then initiated through the Preempt latch 50 as previously explained. It should be noted that for all conditions, that as long as the +ARB/–GRANT signal is low, the arbitration bus is stable and the BUS WON signal is stable. If the +ARB/–GRANT signal goes high, BUS WON goes inactive within 2 gate delays. The Compete latch 52 will not be set unless the —PREEMPT signal is previously driven by the local arbiter 28. The local arbiter 28 will continue to drive the —PREEMPT signal until it eventually wins the competition. The —PREEMPT signal is therefore a global indication of arbitration requests throughout the system.

It is to be understood that while modifications can be made to the structures and teachings of the present invention as described above, such modifications fall within the spirit and scope of the present invention as specified in the claims appended hereto.

Having thus described our invention, what we claim as new, and desire to secure by Letters Patent is:

1. A bus arbitration arrangement comprising g:

a processor;

a memory used by said processor;

a bus for connecting said processor and said memory to plural devices;

means assigning unique linear priorities for access to said bus to devices connected to said bus;

means enabling said devices connected to said bus, which instantly require access to said bus, to present bus contention signals on said bus indicating respective requirements for access and respective assigned priorities;

means dynamically and programmably controlled by said processor for setting individual ones of said devices to arbitrate for access to said bus in one of two modes; said modes consisting of a linear priority mode and a fairness mode characterized in that:

a device enabled by said means enabling said devices connected to said bus to arbitrate in said linear priority mode, and instantly requiring access to said bus, is granted access to said bus when the bus is not instantly in use and the respective device has the highest assigned priority of all devices instantly requiring access to said bus;

said device enabled by said means enabling said devices connected to said bus to arbitrate in said fairness mode, and instantly requiring access to said bus, is granted access to said bus only when: (1) said bus is not in use; (2) the respective device has the highest assigned priority of all devices instantly requiring access to said bus; and (3) other devices which have been manifesting respective requirements for access since the time respective device last used the bus, have respectively been granted access to the bus since that time; and means responsive to said bus contention signals when said bus is not in use for granting control of said bus to a selected highest priority device requiring said bus, which selected device is a device operating in said fairness mode only if other devices having lower priority than said selected device, and which have been manifesting respective requirements for access since the time the selected device last relinquished control over said bus, have been granted access to said bus since that time;

whereby a device enabled by said means enabling said devices connected to said bus to arbitrate in said fairness mode can be programmably and dynamically prevented from unfairly depriving said other devices of access to said IO bus by virtue of said assigned higher priority.

2. A bus arbitration arrangement in accordance with claim 1 including:

means monitoring said bus contention signals presented by said devices requiring access to said bus;

means cooperative with said monitoring means, and effective while said bus is being used by a said device enabled to operate in said fairness mode, for detecting that another said device requires access to said bus; and means responsive to said detection that another device requires said access to said bus for preventing said device using said bus from reacquiring access to said bus, for a time after completing its use and relinquishing control of said bus, until access to said bus has been granted to other device that required access to said bus when said using device relinquished its said control.

3. A bus arbitration arrangement in accordance with claim 2 wherein said means monitoring said bus contention signals, said means for detecting, and said means for preventing reacquisition of said bus are distributed within said devices so that each said device operating in said fairness mode can self-determine when other devices require accesss to said bus while the respective device is using said bus; and wherein said means for preventing in each said device operating in said fairness mode includes:

means, effective when the respective device relinquishes control over said bus after using said bus at a time when other said devices instantly require access to said bus for preventing the respective device from presenting respective bus contention signals until said other devices have received access to said bus.

4. A bus arbitration arrangement in accordance with claim 1 wherein each of said devices comprises:

means effective while the respective device has access to said bus for restricting the amount of time the respective device can retain said access, regardless of whether the respective device is operating in said linear priority mode or said fairness mode.

5. A bus arbitration arrangement in accordance with claim 4 wherein said means for restricting the time each said respective device can retain access to said bus comprises:

means for detecting a reference time when devices other than said respective device begin to request access to said bus, while said respective device is using said bus; and means requiring said respective device to relinquish control of said bus either when said respective device has finished using said bus or within a predetermined time after said reference time, whichever occurs first.

6. A bus arbitration arrangement in accordance with claim 1 wherein:

said bus contains a single line for carrying PREEMPT signals representing a component of said bus contention signals; and said single line is driven to a predetermined state by one or more of said devices when said one or more devices require access to said bus.

7. A bus arbitration arrangement in accordance with claim 1 wherein:

said devices include devices operating in burst and single-transfer modes; said burst and single-transfer modes characterized in that devices operating in said burst mode require ability to conduct multiple cycles of data transfer activity during a single access to said bus and devices operating in said single-transfer mode are restricted to conducting only a single cycle of data transfer activity during a respective single access to said bus; and individual said devices operating in said burst mode are dynamically programmable by said processor to arbitrate at times in said linear priority arbitration mode and at other times in said fairness arbitration mode depending upon the state of usage of said bus by said devices.

8. In a computer system containing processor and memory subsystems, and including a bus for connecting plural devices to said subsystems, a method for programmably and dynamically regulating usage of said bus by said devices comprising the steps of:

(a) assigning unique priorities for access to said bus to devices currently connected to said bus;

b) enabling devices requiring access to said bus to present contention signals on said bus indicating respective requirements for access;

(c) enabling said devices requiring access to said bus to arbitrate for access to said bus in one of two modes; said modes consisting of a linear priority mode and a fairness mode, and being characterized in that:

said device requiring access to said bus and enabled by said step (c) to arbitrate in said linear priority mode, is granted access unconditionally when said bus is not being used and the respective device has higher assigned priority for said access than other said devices instantly requiring access to said bus; and said device requiring access to said bus, which is enabled by said step (c) to arbitrate in said fairness mode and has had prior use of said bus while other devices have been manifesting respective requirements for access, is prevented from reacquiring access to said bus subsequent to said prior use until access to said bus has been granted to said other devices manifesting said respective requirements, even if said other manifesting devices have lower assigned priorities than said respective device arbitrating in said fairness mode; and programmably and dynamically switching individual ones of said devices between said linear and fairness modes under control of said processor subsystem;

whereby access of said devices to said bus can be programmably regulated by said processor to ensure that devices assigned low priorities for access to said bus are not unfairly deprived of access to said bus due to activities of other higher priority devices currently using said bus.

9. The bus access regulation method of claim 8 including:

monitoring said bus for said bus contention signals, while any said device operating in said fairness mode is using said bus, and determining thereby if a said another device instantly requires access to said bus while said bus is being used.

10. The method of claim 8 wherein said determining step includes:

enabling individual said devices arbitrating in said fairness mode to monitor said bus for self-controlling said monitoring and determining step.

11. The method of claim 8 including:

requiring each said device instantly controlling said bus, irrespective of whether the respective device is set to arbitrate in said linear priority mode or said fairness mode, to relinquish its control of said bus within a predetermined time when devices other than said respective device are presenting respective said contention signals.

12. The method of claim 11 wherein said predetermined time for relinquishing said control of said bus is determined by:

detecting a reference time when at least one device other than said respective device controlling said bus begins to require access to said bus; and requiring said respective device controlling said bus to relinquish its control either when said respective device has finished using said bus or within a predetermined time after said reference time, whichever occurs first.

13. The method of claim 8 wherein said bus contains a single line for carrying PREEMPT signals representing components of said request signals; and said request signals are driven in parallel onto said single line by said devices requiring access to said bus in a manner such that said line is always driven to a predetermined active state when one or more of said devices require access to said bus, and said line is always placed in an inactive state when none of said devices require access to said bus.

14. The method of claim 8 wherein said devices that can arbitrate in said linear and fairness modes include devices operating in burst mode and devices operating in single transfer mode, wherein said burst and single-transfer modes are characterized in that devices operating in said burst mode require ability to conduct multiple cycles of data transfer activity during a single access to said bus and devices operating in said single-transfer mode are restricted to conducting only a single cycle of data transfer activity during a respective single access to said bus; and including requiring each of said devices operating in said burst mode to be able to operate in both said linear priority and fairness arbitration modes and to be subject to being programmably switched between said linear and fairness modes by said processor.

* * * * *